No. 645,502. Patented Mar. 13, 1900.
L. A. CARPENTER.
REPAIR PLUG FOR PNEUMATIC TIRES.
(Application filed Oct. 28, 1898.)
(No Model.)
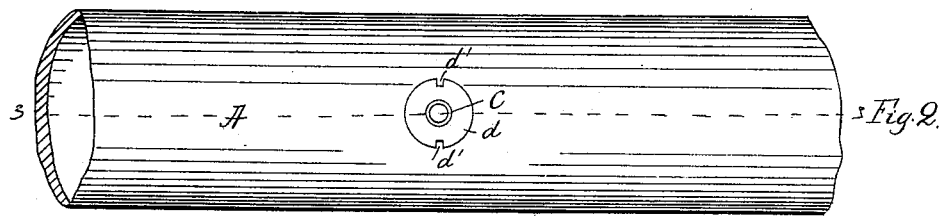
Fig. 2.
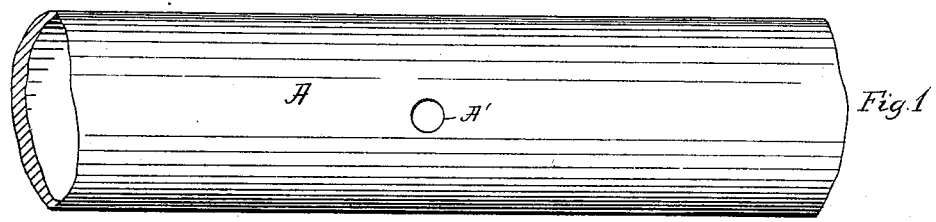
Fig. 1.
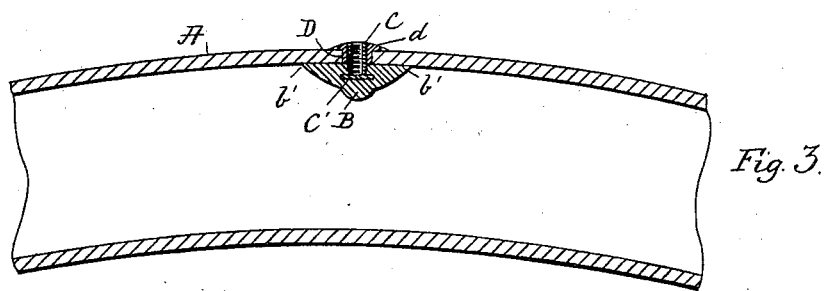
Fig. 3.
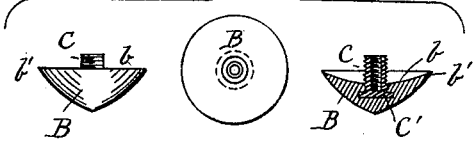
Fig. 5.
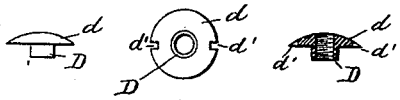
Fig. 6.
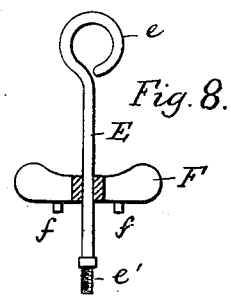
Fig. 8.
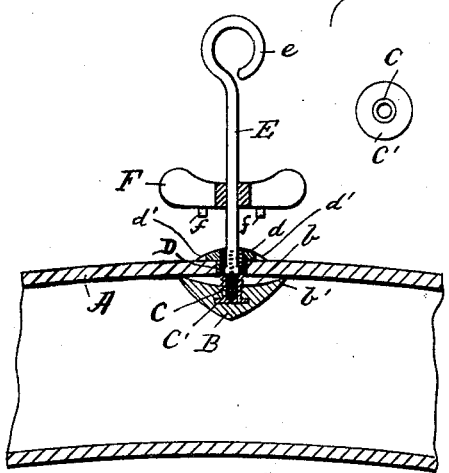
Fig. 7.
Fig. 4.
Witnesses
Karl A. Andrén
William W. Lemmus
Inventor
Lewis A. Carpenter
by Albau Andrén
his atty.

UNITED STATES PATENT OFFICE.

LEWIS A. CARPENTER, OF REVERE, MASSACHUSETTS.

REPAIR-PLUG FOR PNEUMATIC TIRES.

SPECIFICATION forming part of Letters Patent No. 645,502, dated March 13, 1900.

Application filed October 28, 1898. Serial No. 694,803. (No model.)

*To all whom it may concern:*

Be it known that I, LEWIS A. CARPENTER, a citizen of the United States, residing at Revere, in the county of Suffolk and State of Massachusetts, have invented new and useful Improvements in Devices for Repairing Punctured Pneumatic Tires, of which the following is a specification.

This invention relates to an improved device for repairing punctured pneumatic tires for bicycles, &c., and it is carried out as follows, reference being had to the accompanying drawings, wherein—

Figure 1 represents a top plan view of the pneumatic tire that is to be mended. Fig. 2 represents a similar top plan view of the tire after being mended with my improved device. Fig. 3 represents a longitudinal section taken on Fig. 2 and extending through the puncture, the plug, and the parts coöperating therewith. Fig. 4 represents a sectional view showing the flexible plug introduced within the pneumatic tire previous to securing it in position and closing the aperture made at the place of puncture. Fig. 5 represents in side view, top plan, and longitudinal section the flexible plug which is to be used on the inside of the tire for the purpose of closing the puncture. Fig. 6 represents in side view, top plan, and longitudinal section the screw-threaded nut-washer by means of which the flexible plug is secured in place at the puncture. Fig. 7 represents in side and top plan views the screw-threaded shank attached to the flexible plug, and Fig. 8 represents a detail view of the tool for securing the flexible plug and nut-washer at the punctured place of the tire.

Similar letters refer to similar parts wherever they occur on the different parts of the drawings.

In the drawings, A in Figs. 1, 2, 3, and 4 represents a pneumatic tire for bicycles or other vehicles, as usual.

My improved puncture-repairing device consists of a flexible imperforate tapering or conical plug B, that is concaved on its base portion, as shown at $b$ in Figs. 4 and 5, and provided with a thin peripheral feather-edge $b'$, as represented in Figs. 3, 4, and 5. Secured to said flexible plug B is a screw-threaded shank C, preferably provided with a head or flange $C'$, embedded in the mass of the flexible plug B or otherwise secured thereto in any suitable or desirable manner. The head or flange of said shank C may be made circular, notched, or perforated or of any other desired shape, as shown in Fig. 7, without departing from the essence of my invention. The shank C is externally screw-threaded as well as internally screw-threaded, as shown in Figs. 3, 4, 5, and 7, for a purpose as will hereinafter be described. The external screw-thread on said shank is the reverse of the internal one. Thus, for instance, one is a right-hand thread and the other a left-hand one.

D is the fastening-nut, adapted to be screwed onto the shank C when the flexible plug B is to be secured in place on the interior of the punctured tire, said nut being provided with a flange $d$ at its outer end, which flange is adapted to cover the outer portion of the punctured place, as well as to compress the tire between it and the base portion of the flexible plug when the puncture is closed, as shown in Fig. 3. In connection with this my improved puncture-closer I use a suitable tool for pushing the flexible plug through a perforation A', which is made through the punctured portion of the tire, as shown in Fig. 1. Said tool consists of a metal rod or wire E, (shown in Figs. 4 and 8,) having a suitable knob or handle $e$ at its upper end. The lower end of the rod E is screw-threaded, as shown at $e'$, and is adapted to be screwed into the internal screw-thread of the shank C, as shown in Fig. 4. On the rod E is loosely journaled and longitudinally adjustable thereon a thumb-piece or wrench F, having prongs or projections $f\,f$ on its under side, adapted to engage in corresponding notches $d\,d'$ on the flange $d$ of the nut D, as shown.

In using the device for repairing a puncture on a tire I proceed as follows: I first enlarge the puncture by making a circular perforation A', as is common in the art of repairing punctured tires. I then slip the nut D loosely on the rod E and screw the lower end of the latter into the internal screw-thread of the shank C, to which the flexible plug B is attached. I then push said plug through the perforation A' until it assumes the position on the inside of the tire as shown in Fig. 4. I then pull on the rod E so as to bring the base of the flexible plug B in contact with the interior wall of the tire and hold it in such position while I screw the nut D onto the shank C by means of the wrench F until the flexible plug B is brought in close contact with the interior wall of the tire around the punctured place, as shown in Fig. 3, thus making an air-tight connection at such place. If so desired, suitable cement or adhesive substance may be applied to the flexible plug where it fits against the tire; but this is not essential. After the nut has been screwed tightly in place on the shank C the rod E is unscrewed from the latter and removed, leaving the parts in position as shown in Figs. 2 and 3. Instead of having a screw-threaded shank attached to the flexible plug and adapted to engage a nut on the outside of the tire I may reverse the position of such parts and provide the flexible plug with a nut and provide the external washer with a male screw adapted to be screwed into the nut in the plug without departing from the essence of my invention.

What I wish to secure by Letters Patent and claim is—

A puncture-repairing device for pneumatic tires, comprising an imperforate plug of flexible or yielding material, a metallic shank having a head or flange thereon which is embedded in and inclosed by said plug, and a screw-threaded nut or washer coöperating with said shank.

In testimony whereof I have hereunto set my hand in presence of two subscribing witnesses.

LEWIS A. CARPENTER.

Witnesses:
ALBAN ANDRÉN,
WILLIAM W. LUMMUS.